(12) United States Patent  
Ichinoi (10) Patent No.: US 6,266,477 B1
(45) Date of Patent: Jul. 24, 2001

(54) DATA SIGNAL RECORDING AND/OR REPRODUCING METHOD AND SYSTEM OPERABLE WITH ANALOG AND/OR DIGITAL DATA SIGNALS

(75) Inventor: Yutaka Ichinoi, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 08/996,375

(22) Filed: Dec. 22, 1997

(30) Foreign Application Priority Data

Dec. 26, 1996 (JP) .................................................. 8-357368

(51) Int. Cl.[7] ...................................................... H04N 5/76
(52) U.S. Cl. ................................ 386/46; 386/35; 386/124
(58) Field of Search ..................................... 386/1, 35, 39, 386/40, 45, 46, 92, 96, 108, 123, 124, 125, 126; 360/25, 27, 32, 39, 69, 71, 75; 369/53, 58; H04N 5/92, 5/76, 5/91, 9/79

(56) References Cited

U.S. PATENT DOCUMENTS 5,561,608   10/1996  Shimoda et al. .
5,857,059 * 1/1999  Yamagishi ............................. 386/125
5,978,546 * 11/1999  Abe et al. ............................... 386/124

FOREIGN PATENT DOCUMENTS 0 313 368 A2   4/1989  (EP) .
0 313 368 A3   4/1989  (EP) .
0 382 193 A2   8/1990  (EP) .
0 382 193 A3   8/1990  (EP) .
08063875    *  3/1996  (JP) .

* cited by examiner

Primary Examiner—Thai Tran
(74) Attorney, Agent, or Firm—Anderson, Kill & Olick, P.C.

(57) ABSTRACT

A data signal recording and playback method and system that can determine whether the recording medium being used is a high-performance recording medium for recording and playing back both digital and analog signals, or a standard-performance medium, and selecting its recording specifications accordingly. When recording/playing back digital data signals and analog data signals received as inputs to the system, if a high-performance magnetic tape is identified, the system selects for recording, one of the three input signals: a digital data signal, an analog data signal obtained through D/A conversion of a digital data signal, or an analog data signal input as such. If the recording medium being used is a standard-performance magnetic tape, the system selects for recording, either an analog data signal obtained through D/A conversion of a digital data signal, or an analog data signal input as such.

10 Claims, 2 Drawing Sheets

DATA SIGNAL RECORDING AND/OR REPRODUCING METHOD AND SYSTEM OPERABLE WITH ANALOG AND/OR DIGITAL DATA SIGNALS

The present invention relates to a data signal recording and/or playback method and system. More particularly, the present invention relates to a recording and/or playback method and system that is capable of determining whether a medium for recording/playback of digital and analog data signals is a high-performance or a standard-performance recording medium, and selecting the proper recording medium.

BACKGROUND OF THE INVENTION

Recent advancements in digital signal processing technology have been accompanied by progress in the digitization of video signals. Along with this, in addition to the analog data signals of standard television broadcasts, digital data signal broadcasts via satellites are now starting to be realized, creating a demand for media to record and reproduce these broadcast data signals.

On the other hand, home VTRs (VCRs) for recording and playing back standard analog video and audio signals are already in widespread use throughout the world, and an enormous amount of recorded material for these systems already exists in analog format. What is needed is a hybrid method and system that not only can record and play back the new digital data signals, but can also play back this enormous volume of existing recorded material. In other words, what is needed is a system that is "downward compatible" with the current analog VTRs, but is also "upward compatible."

Proposed in Japanese Laid-Open Patent Application No. H8-63875 (1996), as a VTR capable of handling both analog and digital formats, is a recording and playback system that can automatically determine the signal format of the signals being played back from a recording storage medium on which a mixture of both analog and digital signals are recorded.

Such a recording and playback system, however, is concerned only with automatically determining the signal format of signals being played back from a storage medium on which a mixture of both analog and digital signals were recorded. There is nothing in this disclosure that suggests means or a method for selectively recording analog and digital data signals.

That is, because the signal processing performed to record digital data signals differs from that performed for analog signals, it is preferred to use different recording media when recording digital and analog signals. Nothing is included in the above-noted application, however, that suggests a way to select the digital/analog data signal processing to be performed during recording, based on the performance specifications of the recording medium.

Therefore, there is a need to propose a data signal recording and playback method and system wherein, with recording media for recording analog data signals classified as "standard performance" media, and recording media for recording digital data signals classified as "high-performance" media, the system would be capable of sensing the performance level specification of the medium and performing the best signal processing for that medium for the type of signal being recorded.

Also, while it is, of course, better to use a digital recording technique to record digital data signals, there is also a need for a system that, in addition to identifying the recording medium, as discussed above, also provides the capability to use an analog recording technique to record digital data signals, in order to maintain compatibility with existing analog VTRs that, as previously mentioned, are in such widespread use throughout the world.

Such analog and digital VTRs must be designed with an emphasis on how the consumer will be using the systems. For example, the systems will have to provide the capability to receive digital and analog broadcasts and either view them on an external display device such as a video monitor, or send them to external recording and playback equipment. Also, in addition to switching the individual analog and video signal outputs to their respective connectors, users will also want the capability to convert digital signals to analog signals for output. In short, these new video digital/analog hybrid systems will require a variety of output switching functions.

So far, no technology has been disclosed for the above recording and playback systems for automatically recognizing the recording storage media formats for recordings having a mixture of digital and analog signals in addition to performing the above output switching functions.

Accordingly, the method and apparatus incorporating the principles of the present invention provides, for VTRs that accommodate signals in both analog and digital format, a data signal recording and playback system that is capable of performing a variety of output switching functions, including the conversion of digital signals to analog signals prior to output. More specifically, the embodiments of the present invention provides a data signal recording and playback system wherein all required output switching is performed within the recording and playback system itself, so that display switching, etc., need not be performed in external display devices such as video monitors.

SUMMARY OF THE INVENTION

It is accordingly an object of the present invention to overcome the problems of prior art solutions.

To solve the above problems, an embodiment of the present invention relates to a data signal recording and/or playback system for selectively recording and/or playing back digital and/or analog data signals on/from a recording medium. The recording medium can be at least a first or a second type. The system includes: first receiving means for receiving a digital signal and producing a digital data signal. Digital recording means are provided which are responsive to the digital data signal for performing a preselected process thereon and recording the resulting signal on the recording medium.

Decoder means are included for decoding a digital data signal and producing a first analog data signal. Also included are second receiving means for receiving an analog signal and producing an analog output signal. Analog recording means are responsive to the analog output signal for performing a preselected process to form a second analog data signal and recording the second analog data signal on the recording medium.

A discriminator is operatively associated with the recording medium for identifying whether the recording medium is the first or the second type. If the recording medium is the first type, one of the group consisting of the digital data signal, first analog data signal, and second analog data signal is recorded thereon. If the recording medium is the second type, one of the group consisting of the first analog data signal and the second analog data signal is recorded thereon.

The present invention also includes a data signal recording method for selectively recording digital and/or analog data signals on a first or second type of recording medium. The method includes the steps of: receiving a digital signal and producing a digital data signal; decoding the digital data signal to produce a first analog data signal; and receiving an analog signal and producing an analog output signal.

A preselected process is performed on the analog output signal to form a second analog data signal. A further step identifies whether the recording medium is the first or the second type. If the recording medium is the first type, one of the group consisting of the digital data signal, first analog data signal, and second analog data signal is recorded thereon. If the recording medium is the second type, one of the group consisting of the first analog data signal and the second analog data signal is recorded thereon.

In a preferred embodiment, the first type of recording medium is a high-performance recording medium and the second type of recording medium is a standard-performance recording medium.

In a further embodiment when a digital data signal or an analog data signal is recorded on high-performance magnetic tape, in the digital recording means, a first recording specification for performing signal processing in which a digital data signal is recorded as a bit stream is selected. In the analog recording means, a second recording specification for performing signal processing is selected in which the first or the second analog data signal is recorded over a broader-than-standard frequency bandwidth. In the analog recording means, a third recording specification for performing signal processing is selected in which the first or the second analog data signal is recorded over a standard frequency bandwidth. When the first or second analog data signal is recorded on standard-performance magnetic tape, the third recording specification is selected in the analog recording means.

BRIEF DESCRIPTION OF THE DRAWINGS

The above and other objects, features, and advantages of the present invention will become more apparent from the following detailed description taken with the accompanying drawings, in which:

FIG. 2, including

DESCRIPTION OF THE PREFERRED EMBODIMENTS

Figure 1:
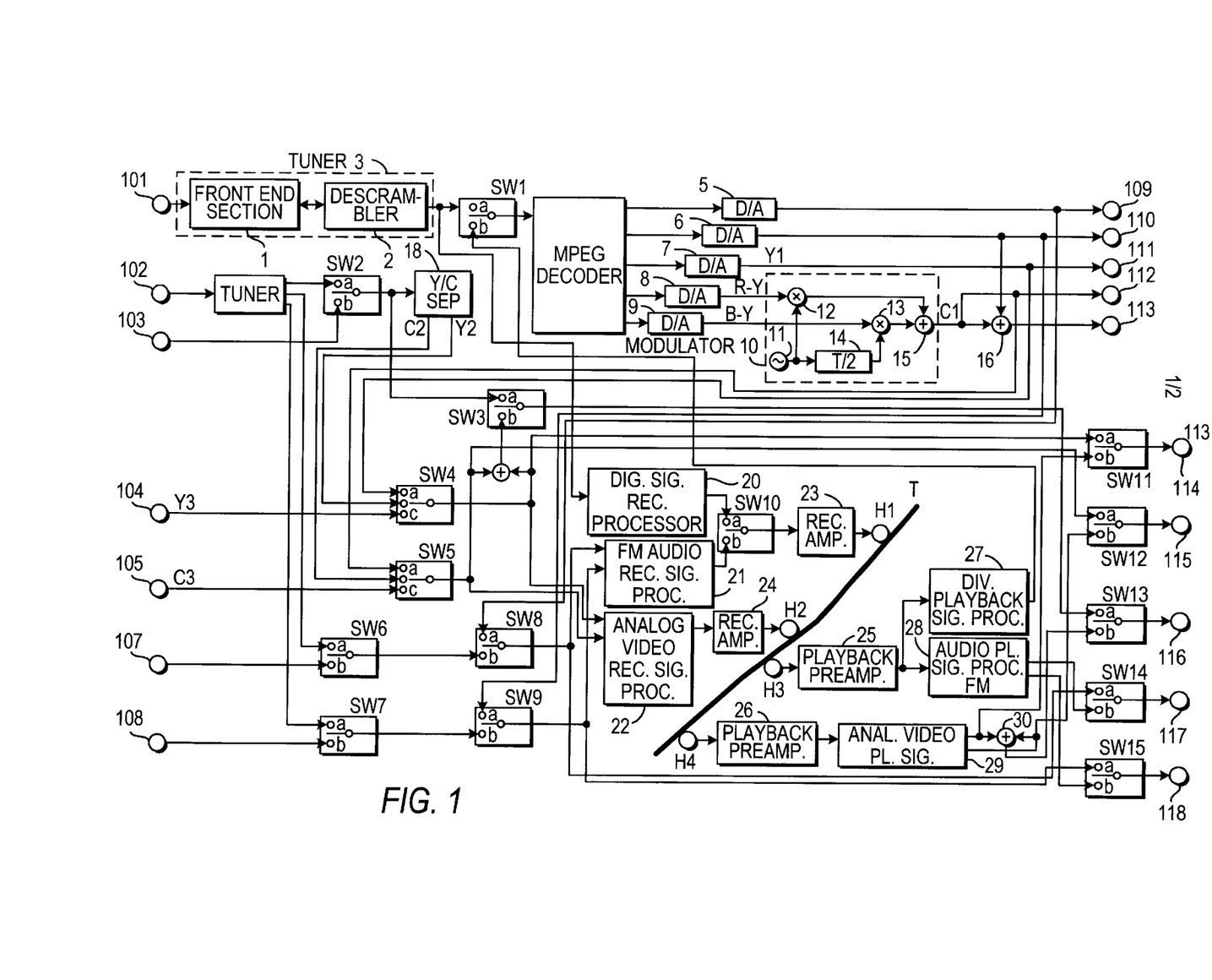
FIG. 1 is a block diagram of an embodiment of the data recording and playback system incorporating the principles of the present invention.

Referring to the drawings, FIG. 1 is a block diagram of an embodiment of the data recording and playback system incorporating the principles of the present invention. FIG. 2 shows the respective frequency allocations for standard and high-performance media. FIG. 3 is a drawing to support the description of a sensor means for sensing the performance specification of recording media. An embodiment of the present invention will be described below, with reference to these drawings.

As shown in FIG. 1, a digital broadcast signal received from a satellite antenna cable or a CATV (cable television) cable (not illustrated) connected to input terminal 101, is applied to a first receiver section (digital broadcast signal tuner 3). The front-end section 1 of this tuner 3 performs tuning to select the desired channel and frequency conversion, and outputs the resulting signal to a descrambler 2. The descrambler 2 removes encryption that was performed at the broadcast station to prevent unauthorized use, and outputs the resulting signal as a bit stream that is the digital signal representation of the video and audio.

The bit stream output by the descrambler 2 is supplied to the digital signal record processor 20 (to be described later), and also to the input terminal for the "a" side of a switch SW1. Applied to the input terminal for the "b" side of switch SW1 is a playback digital signal from a recording medium T (e.g., magnetic tape). The armature of switch SW1 is operated to the "b" side when the data signal recording and playback system is playing back a recorded digital signal from the recording medium. Otherwise it is normally operated to the "a" side.

When the armature of switch SW1 is operated to the "a" side, the above bit stream is supplied to a decoder means (MPEG decoder 4), where video and audio signals compressed in accordance with the MPEG format prior to digital broadcast transmission are decoded (decompressed). MPEG decoder 4 contains an audio decoder and a video decoder for separately decoding audio and video signals that were compressed in accordance with an MPEG format. The audio decoder decodes "first" and "second" audio signals, which are applied to the D/A converters 5 and 6, respectively, for conversion to analog audio signals to be output at output terminals 109 and 110, respectively.

In addition to being applied to output terminals 109 and 110, respectively, these first and second audio signals from the MPEG decoder 4 are also applied to the input terminals for the "a" sides of switches SW8 and SW9, respectively, which will be discussed later. These first and second audio signals might also be called, for example, first and second audio channels. Specifically, they could be audio signals for left and right stereo channels, for two different languages, or audio signals for a main channel and an auxiliary channel that could be used for descriptive information, for example.

The video decoder in the MPEG decoder 4 decodes a video luminance signal (Y1) and two color difference signals (R-Y and B-Y). The Y1 luminance signal is converted to an analog signal by a D/A converter 7, after which it is supplied to the Y signal output terminal 111, the "a" input of a switch SW4, and to an adder 16 (to be described later).

Of the two color difference signals decoded by this video decoder, for example, the R-Y signal is converted to an analog signal by a D/A converter 8, and the B-Y signal is converted to an analog signal by a D/A converter 9. These D/A-converted color difference signals are applied to a quadrature biphase modulator 10. In the modulator 10, the two color difference signals modulate two carrier signals that differ in phase by 90 degrees. These quadrature carriers are generated by the combination of a local oscillator 11 and a phase-shifter 14. The modulated carriers thus formed are summed in an analog summing circuit 15 to form the color carrier signal (C1). Signals Y1 and C1 are also referred to collectively as a "first analog data signal."

The above C1 signal is applied to C signal output terminal 112, to the "a" input of switch SW5, and also to an analog summing circuit 16 (to be described later). The above Y signal output terminal 111 and C signal output terminal 112, for example, might collectively constitute a Y/C separation signal output connecter ("S" connector). Switches S4 and S5 constitute a first switching means.

Returning to the system inputs, a high-frequency signal, i.e., a standard (earth-based) or analog satellite broadcast signal, from an antenna (not shown), is received at an input terminal 102. In a tuner 17, this high-frequency signal is subjected to prescribed signal processes, such as frequency conversion and detection, for output as a composite video signal and two channels of audio. The composite video signal from tuner 17 is supplied to the "a" side input terminal of switch SW2. Connected to the "b" side input terminal of switch SW2 is a composite video signal from external video input terminal 103.

Switch SW2 selects for its output, the desired one of its inputs, under control of the user. This control might be performed, for example, through a hand-held remote control unit or an advance-program scheduling unit set to select a particular input at a particular time (neither unit illustrated). Switch SW2 may also be made up of multiple sections connected to a number of tuners 17 for selection of one of many satellite or earth-based channels, for example, or a number of external video input terminals connected to different composite video signal sources.

The composite video output of SW2 is applied to a known Y/C separator 18 configuration comprising a comb filter, etc., and also to the "a" side input terminal of a switch SW3. The composite video output by switch SW3 is in turn supplied to the "a" side input terminal of switch SW13. Switches SW3 and SW13 constitute a third switching means.

The Y/C separator 18 separates its received composite video signal and outputs the resulting signals as respective luminance and color carrier signals Y2 and C2. The Y2 signal is input to the "b" input terminal of switch SW4, and the C2 signal is applied to the "b" input terminal of switch SW5. The "c" inputs of switches SW4 and SW5 receive luminance signal Y3 and color signal C3 from luminance and color signal input terminals 104 and 105 of "S" connector, respectively. The luminance and color signals selected for output by SW4 and SW5, respectively, are supplied as "second analog data signals" to YC combiner 19, the "a" inputs of switches SW11 and SW12, and an analog video record signal processor 22. Switches SW11 and SW12 constitute a second switching means.

The two channels of audio output from the tuner 17, and the two channels from external audio input terminals 107 and 108 (which could be, for example, left and right stereo channels, different languages, or main channel and auxiliary channels, as described above) are input to the "a" and "b" sides, respectively, of switches SW6 and SW7. Switches SW6 and SW7 select for their outputs, either the audio signals from the tuner, or those from external audio input terminals 107 and 108.

The operation of switches SW6 and SW7 is linked to that of switches SW4 and SW5. When the "first analog data signal" output is selected, however, the operation of switches SW6 and SW7 is linked to that of switches SW8 and SW9. The outputs of switches SW6 and SW7 are connected to the "b" inputs of switches SW8 and SW9. The outputs of switches SW8 and SW9 are supplied to an FM audio record signal processor 21 and the "a" inputs of switches SW14 and SW15. The outputs of switches SW14 and SW15 are fed through VTR audio output terminals 117 and 118 to a communications circuit (not illustrated).

To perform analog recording in VHS format using the "color-under" system, for example, the "second analog data signals" from switches SW4 and SW5 are processed in analog video record signal processor 22. In this process the luminance signal is FM modulated, and the color signal is down-converted to a low frequency (e.g., 629 kHz) for recording. Both signals are then frequency-multiplexed and output from analog video record signal processor 22 as the record analog video signal, which is then sent through record amplifier 24, to be recorded on magnetic tape T by a magnetic head H2.

At the same time, the two channels of audio from switches SW8 and SW9 are being processed in FM audio record signal processor 21 for recording. This consists of FM-modulating two different-frequency carriers with the two channels of audio, and frequency-multiplexing the modulated carriers for output to the "b" input of switch SW10, as one signal. The armature of switch SW10 is operated to the "b" side to select this FM audio signal to be amplified by record amplifier 23 and recorded ahead of the above-noted record analog video signal on the magnetic tape T by a magnetic head H1. This will result in the FM audio signal being overwritten by the analog video signal. It is well known, however, that if recording conditions such as frequency, record level, and head azimuth angles are properly set, the unerased signal remaining after this overwriting will be strong enough to enable a signal of sufficiently good audio quality (so-called "VHS hi-fi audio") to be obtained during playback.

Note that the processing of the audio signal for recording need not necessarily be an FM modulation process performed by an FM audio signal processor 21. The signal could also be recorded, for example, as a digital pulse code modulated (PCM) audio signal.

Also, although not shown here, in helical scan VTRs, the above magnetic heads H1 and H2 are mounted on a rotary drum such that as the drum spins, the heads scan across the width of the tape wrapped around the drum, such that they form track patterns on the tape as the drum turns and the tape travels past it, thus recording the analog video and audio signals in the prescribed tracks as they scan.

To play back the audio and analog video signals recorded as described above, the playback signals obtained when magnetic heads H3 and H4 scan the magnetic tape T are amplified to prescribed levels by playback preamplifiers 25 and 26, and supplied to FM audio playback signal processor 28 and analog video playback signal processor 29, respectively.

As described above for heads H1 and H2, magnetic heads H3 and H4 are actually mounted on a rotary drum not shown in the drawing. Of course, playback heads H3 and H4 may serve either as playback-only heads, as in the configuration shown here, or as dual-purpose record/playback heads.

Analog video playback signal processor 29 performs the signal processing necessary to output playback color carrier and luminance signals (e.g., FM demodulation of the luminance signal and frequency conversion of the color signal). The luminance and color carrier signals thus obtained are supplied to the "b" side input terminals of switches SW11 and SW12, respectively (the second switching means), and to YC combiner 30. In FM audio playback signal processor 28, the playback audio signal from magnetic head H3 is FM-demodulated to output two channels of audio, which are sent to the "b" side input terminals of switches SW14 and SW15. The luminance (Y) and color (C) signal outputs of switches SW11 and SW12 are applied to the Y signal output terminal 114 and the C signal output terminal 115, respectively. Together, output terminals 114 and 115 constitute a "YC separation output terminal."

The YC combiner 30 then frequency multiplexes the reproduced luminance and color signals to generate a composite video signal at its output. This output is applied to the "b" input of switch SW13. During analog video signal playback, switch SW13 selects its "b" input for output to composite video signal output terminal 116. Output terminal 116 constitutes the "composite video signal output terminal."

During analog signal playback in the present data recording and playback system, video and audio signals being played back from magnetic tape T can be output from the system by selecting the "b" inputs of switches SW11 through SW15.

In addition to the analog recording and playback described above, digital bit streams can also be recorded and played back. These operating modes will now be described. In the digital record signal processor 20, the bit stream received from the digital broadcast tuner 3 is subjected to prescribed signal processing to perform processes such as the addition of error-correction coding and header data. The resulting output is supplied to the "a" side input terminal of switch SW10. During digital recording, the armature of switch SW10 is operated to its "a" side to supply the digital record signal to the record amplifier 23, from which it is supplied to magnetic head H1, which records it on magnetic tape T.

When a digitally recorded magnetic tape T is played back, the playback signal is retrieved from the tape by magnetic head H3 and supplied through the playback preamp 25 to the digital playback signal processor 27, where signal processing (error correction, etc.) is performed prior to applying the signal to the "b" side input terminal of switch SW1. In playback, this playback data, now in the form of bit stream data, is selected by switch SW1 for output to the MPEG decoder 4. In MPEG decoder 4, the digital video and audio signals are decoded prior to being converted to analog signals by the D/A converters, as described earlier for the signals received from the digital broadcast tuner 3. From the D/A converters, the signals are applied to their respective external output terminals 109 through 113.

An analog/digital VTR system, featuring dual use of magnetic heads H1 and H3 for the recording and playback of both FM audio analog signals and digital data, was proposed by the applicant in Japanese Laid-Open Patent Application No. H8-90078. For the recording and playback of analog and digital data, the above data signal recording and playback system may also use the same configuration as that described in this patent application.

Moreover, in this embodiment, magnetic tape T is used as the recording medium. However, the recording medium used is not important. The invention may, of course, be used equally well with other media such as recordable optical disks, in which case the magnetic heads would be replaced by optical heads.

Next, the outputting of analog signals from the present data signal recording and playback system will be described. For this discussion, assume, for example, that the present data signal recording and playback system is in a recording mode, or in a recording/playback standby mode, with digital data signals selected for output. With the system in this state, if the user now performs operations from a control panel or a remote control unit (not illustrated) to instead output the above first analog data signal, switches SW3 through SW5 and SW11 through SW13 (first through third switching means) will be operated to output the desired signals, as described below.

Switches SW4 and SW5 (the first switching means) are operated to select their "a" inputs. This selects the first analog data signal for output to the "a" inputs of switches SW11 and SW12 (the second switching means), and through the summing circuit 19 to the "b" inputs of switch SW3. Switches SW11 and SW12 (the second switching means) are operated to their "a" sides to select the first analog data signals for the YC separation "S" connector. Operation of the third switching means causes SW3 to select its "b" input for output to the "a" input of switch SW13, and switch SW13 to select its "a" side, thus outputting the first analog data signals as a composite video signal.

Now, by operating switches SW4 and SW5 to select their "b" or "c" inputs (with switches SW3, and SW11 through SW13 left as described above), the second analog data signal can be directed to the YC separation and composite video outputs. Depending on the position of switch SW2, the input signal selected for this second analog data signal can be either the analog data signal from the receiver via input terminal 102 or the analog data signal from the external input terminal 103. Also, switches SW4 and SW5 can be operated to select either YC-separated composite video or the YC separation signal analog inputs (separate Y and C signals) from input terminals 104 and 105 for output.

When the present data signal recording and playback system is performing a playback operation, it can determine whether the signal recorded on the magnetic tape T is a digital data signal or an analog data signal. A method of determining the type of signal recorded on magnetic tape was proposed by the applicant in Japanese Laid-Open Patent Application No. H8-90078. When it is determined by this method that the signal recorded on the magnetic tape T is a digital data signal, switches SW3 through SW5 and SW11 through SW13 (the first through third switching means) are operated to route signals such that playback digital data signals obtained from digital playback signal processing means 27 can be processed through decoder means 4, and output as the first analog data signal.

That is, the digital data signal reproduced by the digital playback signal processor 27 is routed through switch SW1 to the MPEG decoder 4 as described earlier. After processing by the MPEG decoder 4 and D/A converters 7, 8 and 9, the playback signal is supplied to switches SW4 and SW5 as the first analog data signal (Y1, C1). From the outputs of switches SW4 and SW5, it is routed through switch SW3 and SW13 (composite video), and switches SW11 and SW12, which are operated to select this signal for the YC separation outputs.

Similarly, when the system detects an analog data signal recorded on magnetic tape T, switching means SW3, and SW11 through SW13 output an analog playback data signal from analog playback signal processing means 28 and 29 (also referred to as the "third analog data signal").

It can be seen that the described data signal recording and playback system can output analog data signals at output terminals 114 through 118 regardless of whether the signal being input or played back is a digital data signal or an analog data signal. Thus if a monitor device, for example, is connected to these output terminals, the desired signal can be monitored without switching the display for the type of signal being monitored.

It has long been possible to perform recording and playback on an analog VTR in accordance with both "normal VHS" and "S-VHS" recording specifications, as long as the tape used in the VTR is high-performance tape. That is, with the precondition that the magnetic tape used in the analog VTR be high-performance tape, in which the high-frequency-bands C/N ratio is improved over that of standard performance tape, it has long been possible to use an analog VTR to perform recording/playback in accordance with recording specifications appropriate for standard-performance tape (in VHS recording method, for example, the "normal VHS" recording specification), and also in accordance with a high-performance recording specification in VHS recording method, for example, the "S-VHS" specification), which provides higher picture quality image data than is possible with the standard (normal VHS) recording specification.

Figure 2A:
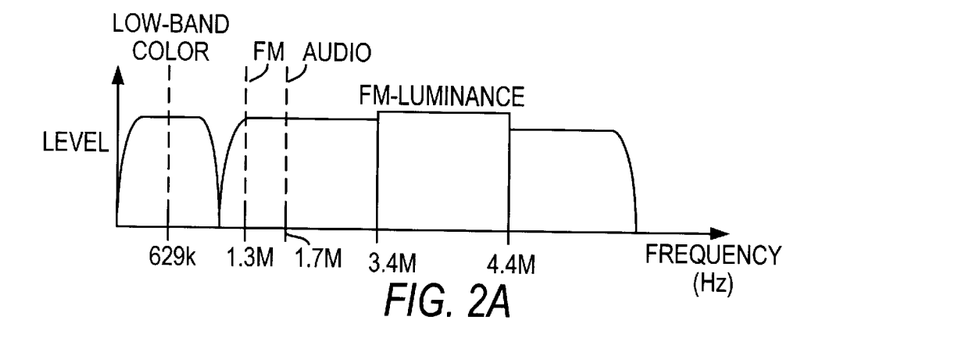
FIGS. 2(A) and 2(B), are waveforms showing the respective frequency allocations for standard- and high-performance media.
Figure 2B:
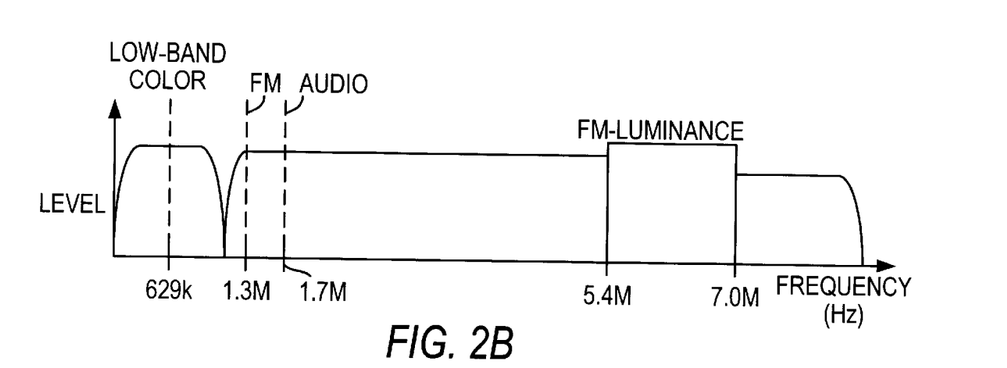
Figure 3:
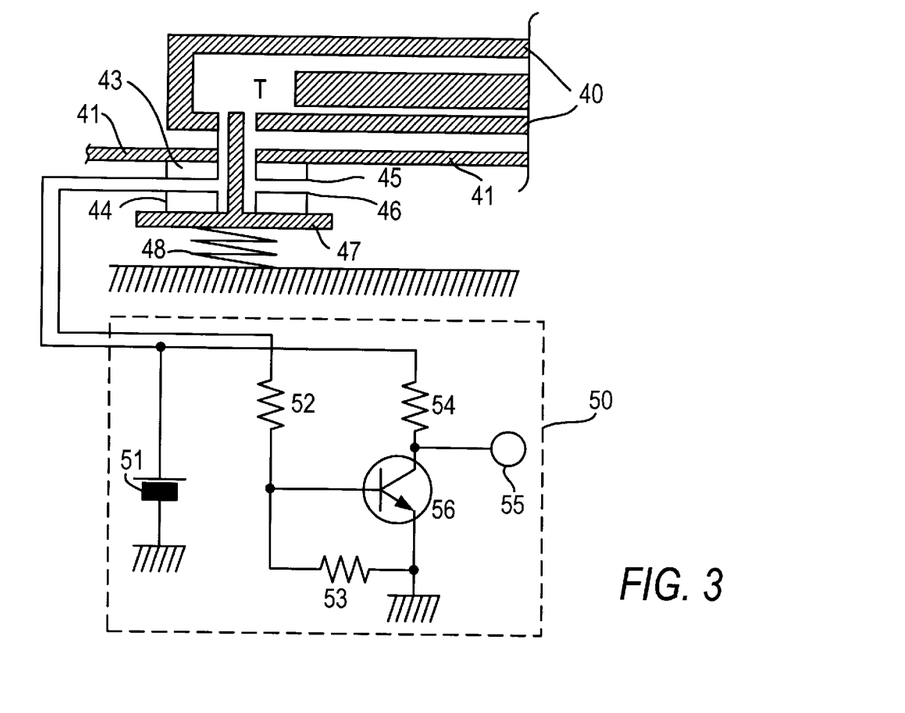
FIG. 3 is a schematic drawing for describing a sensor means.

FIGS. 2(A) and 2(B) show the respective record signal frequency allocations according to the "normal VHS" and "S-VHS" recording specifications mentioned above. It is known that setting the luminance signal FM band to a higher frequency band in S-VHS than it is in normal VHS makes it possible to reproduce higher resolution recorded images. For this discussion, the term "normal VHS" is used only as a way of distinguishing between this standard performance recording specification and the higher-performance S-VHS recording specification, with the term "normal VHS" denoting a recording specification having the video signal frequency allocations shown in FIG. 2(A), without regard to whether there are signals recorded in so-called VHS hi-fi audio.

The cassettes used to hold high-performance and standard-performance tape are made differently. The purpose is to enable recording and playback equipment to automatically sense the type of tape they contain, such as a "sensing hole" at a prescribed location on the bottom of the cassette, as shown in FIG. 3.

In FIG. 3, item 40 is a tape cassette containing reels (not illustrated) on which the magnetic tape T is wound. Item 41 is a support member used to load the tape cassette 40 into the present data recording and playback system. Item 42 is the frame of the present data recording and playback system. Items 43 and 45 are electrodes attached to support member 41. Item 47 is a sensing member for sensing the tape type by detecting the presence or absence of the aforementioned sensing hole in the cassette. Items 44 and 46 are electrodes attached to sensing member 47. Item 48 is a spring for pressing sensing member 47 upward, and 50 is a sensing circuit.

A tape cassette 40 loaded in the present data recording and playback system is placed so that the sensing member 47 protruding upward from under the support member 41 will be pressed by the spring 48 between the frame 42 of the present data recording and playback system and the bottom of sensing member 47 so as to protrude at a location corresponding to that of the sensing hole in the bottom of the cassette.

When a cassette with a sensing hole (a cassette containing high-performance tape) is inserted, the sensing member 47 is pressed by the spring 48 so that it protrudes into the sensing hole, bringing electrodes 43 and 45 into contact with electrodes 44 and 46, respectively. When a cassette without a sensing hole (one containing standard-performance tape) is inserted, the sensing member 47 protrudes only as far as the bottom of the cassette 40, thus preventing the electrodes from making contact. In FIG. 3, in which sensing member 47 is not fully extended, the electrodes are not making contact even though the cassette has a sensing hole. Actually, however, when the cassette has a sensing hole, the reactive force of spring 48 presses electrode 43 into contact with electrode 44, and electrode 45 into contact with electrode 46.

Electrodes 43 and 44 (or electrodes 45 and 46) are electrically connected to sensing circuit 50. Sensing circuit 50 comprises a well-known inverter circuit made up of a d.c. power source 51, resistors 52, 53, and 54, and a transistor 56. Electrode 43 is connected to the d.c. power source 51, and electrode 44 is connected through resistor 52 to the base of the transistor 56. In other words, the electrical potential at terminal 55 will be high for a cassette containing standard-performance tape, and low for a cassette containing high-performance tape, thus making it possible to discriminate between cassette types.

Operation of the present data recording and playback system will be described below for each of several examples. For these descriptions, it will be assumed that for digital recording as described above, a recording specification ("first recording specification") has been defined as a prerequisite for performing high-density recording using high-performance magnetic tape, and that good play-back data cannot be obtained if standard-performance tape is used. In this situation, the apparatus incorporating the principles of the present invention performs the most appropriate recording for the type of recording medium inserted into the cassette receptacle, and for the instructions entered by the user via a remote control unit, etc. (including scheduling in advance to record between specific times, operation over telephone lines from a remote location, operation from a personal computer, etc.).

The first example to be considered is one in which the inserted cassette contains standard-performance magnetic tape.

Note that as discussed earlier, this need not be a magnetic tape. It could also be another storage medium such as an optical disk. If it is an optical disk however, the disk must, as a minimum, be provided with some means of discriminating between standard-performance and high-performance disks, such as the system described above for tape cassettes. (For example, the disk could also be provided in a cassette with a sensing hole.)

Referring again to FIG. 1, if, in response to instructions from the user, the analog video signal coming in at either input terminals 102 and 103, or input terminals 104 and 105, is selected for recording, switches SW2, SW4, and SW5 are operated to route the selected video signal to analog video record signal processor 22. Similarly, the desired audio signal, either from the tuner 17 or from external audio input terminals 107 and 108, is selected by switches SW6 and SW7, and is routed through switches SW8 and SW9 (operated to select their "b" inputs) to FM audio record signal processor 21, to perform normal VHS recording.

If, in response to instructions from the user, a digital broadcast received signal is selected, switches SW4, SW5, SW8, and SW9 are all operated to select their "a" inputs. This configures the system to perform "normal VHS" recording of analog video and audio signals that have been decoded from the digital broadcast receive signal by MPEG decoder 4 and converted to analog signals by the D/A converters ("third recording specification").

Thus because the signals from MPEG decoder 4 are supplied to input terminals provided on SW4, SW5, SW8, and SW9, data content (television programs, etc.) received as digital broadcasts can still be recorded (albeit by analog recording) even when a standard-performance recording medium, which is not intended for recording digital bitstream data, is inserted. This is a major advantage to the user in that it makes it possible to record a desired digital broadcast program even if the only tape on hand at the time happens to be of the standard-performance variety.

Moreover, "copy-control data," for specifying whether information may be copied, is now transmitted at specific locations in the data transfer format. This is done, for example, to provide protection for digital media intellectual property rights in digital broadcasts, and to control access in so-called "video-on-demand" (VOD) systems, where fees are charged on a per-program basis. Consideration is now being given to making the receiving system responsible for detecting this copy control data, and controlling the output of signals accordingly.

For example, with regard to the digital bit stream, the actual received information may be reflected as-is, and the copy control data transmitted by inserting it at a specific location in the format (which will be called "copy control signal D"), or copy control bits may be inserted in specific lines of the vertical blanking period of the output analog video (which will be called "copy control signal A"). Along with this, a number of lines other than those in the vertical blanking period are also used for insertion of "copy-protect" signals. Japanese Laid-Open Patent Application No. S63-107281 (1988), for example, proposes such "copy-protect" signal insertion.

These copy-protect signals operate by making the record system AGC circuit in the video recorder malfunction. Once the system has determined, from the copy control data, that the material is copy protected, the process of inserting these copy-protect signals might be performed as a digital process, for example, in the MPEG decoder 4 output stage. When the MPEG decoder 4 is configured to perform this process, if a copy-protected signal is then recorded, at playback, the copy-protect signals in the playback signal will cause the AGC circuit in the first stage of the luminance signal system of the analog video record signal processor 22 to malfunction, degrading the picture to where it will be impossible to view. This effectively prevents the copying of the protected material, thus providing the desired intellectual property protection.

For a user who records protected material because he or she is simply unaware of the copy protection, however, this is a needlessly wasted recording. In addition to not being able to view the desired material, such a user has been inadvertently deprived of the use of the recording and playback system for other purposes (such as playing back other tapes) while the protected material was being recorded. This problem can be avoided, however, by detecting and interpreting the content of the copy-control data transmitted in digital broadcasts. When it is determined that the material is copy-protected, the startup of the tape transport can then be inhibited, and the user notified of the copy protection, through the system display.

Even when systems are set up to support this kind of copy protection, there will still be free-access programs that are transmitted without copy protection (transmitted with copy protection not specified in the copy-control data). Thus the capability to record these free-access programs will always provide an important advantage.

Next consider the example in which the system has sensed that the inserted cassette contains high-performance magnetic tape. If, in response to instructions from the user, the analog video signal coming in at either input terminals 102 and 103, or input terminals 104 and 105, is selected for recording, switches SW2, SW4, and SW5 are operated to route the selected video signal to analog video record signal processor 22. Similarly, the desired audio signal, either from the tuner 17 or from external audio input terminals 107 and 108, is selected by switches SW6 and SW7, and is routed through switches SW8 and SW9 (operated to select their "b" inputs) to FM audio record signal processor 21, to perform either S-VHS (second recording specification) recording, or normal VHS recording (third recording specification), depending on initial settings or operating commands entered by the user.

If, in response to instructions from the user, the received digital broadcast signal is selected as the input signal to be recorded, one of two recording methods will be selected.

The first recording method is digital recording. In this method, the armature of switch SW10 is operated to the "a" side. This selects, for recording, the bit stream that was output from the digital broadcast tuner 3 and signal-processed in digital record signal processor 20. The data is recorded on high-performance magnetic tape T by a digital recording process (first recording specification).

The second recording method is analog recording. In this method, switches SW4 and SW5, and switches SW8 and SW9 are all operated to select their "a" inputs. The received digital broadcast signal is decoded by the MPEG decoder 4 and converted to analog video and audio signals by the D/A converters. Switches SW4 and SW5 route the analog video signals through analog video record signal processor 22 for recording, and switches SW8 and SW9 route the two channels of audio through FM audio record signal processor 21 for recording. Depending on initial settings, or operating commands entered by the user, the signals will be recorded in either S-VHS (second recording specification) or normal VHS format (third recording specification).

The selection that determines which of these two recording methods will be used is made in accordance with initial settings or operational inputs by the user. For example, the initial settings might specify digital recording. This selection will apply unless the user overrides it by using the remote control unit to specify analog recording.

The reason the system is set up to allow analog recording to be selected for recording digital signals even though it would be possible to record them as digital recordings, is to provide the capability to record tapes that can be played-back on older video decks that are only capable of playing back analog recordings.

In this manner, the present data signal recording and playback system can be configured to operate in the following modes:

When a high-performance tape is loaded in the system, the tape can be recorded according to any one of three selectable recording specifications:

1. A first recording specification in which a digital data signal is recorded as a bit stream;
2. A second recording specification in which an analog data signal or a digital data signal converted to an analog signal is recorded in accordance with S-VHS specifications; and
3. A third recording specification in which an analog data signal or a digital data signal converted to an analog signal is recorded in accordance with normal VHS specifications.

When a standard performance tape is loaded in the system it is recorded according to the above third recording specification, in which an analog data signal or a digital data signal converted to an analog signal is recorded in accordance with normal VHS specifications.

A digital or analog signal can therefore be recorded by a process selected based on the performance specification (high/low-performance) of the magnetic tape, thus enhancing the flexibility of the system from the standpoint of the user.

When standard-performance recording media are specified as the media to be used for recording analog data signals, and high-performance media are specified as the media to be used for recording digital data signals, the apparatus incorporating the principles of the present invention provides an advantage in that when a recording is being made, it senses the performance-level specification of the medium being used (or identifies the recording medium), so that the best recording signal processing mode can be selected for the medium being used.

Furthermore, because the system is capable of recording digital data signals in analog format, it provides an additional advantage in that this recorded data can be played-back by an analog VTR, and recording media compatibility is therefore maintained.

Various modifications will become possible for those skilled in the art after receiving the teachings of the present disclosure without departing from the scope thereof.

What is claimed is:

1. A data signal recording and/or playback system for selectively recording and/or playing back digital and/or analog data signals on/from a recording medium, said recording medium being at least a first or a second type, said system comprising:

first receiving means for receiving a digital signal and producing said digital data signal;

digital recording means responsive to said digital data signal for performing a preselected process thereon and recording the resulting signal on said recording medium;

decoder means for decoding said digital data signal and producing a first analog data signal;

second receiving means for receiving an analog signal and producing an analog output signal;

analog recording means responsive to said analog output signal for performing a preselected process to form a second analog data signal and recording said second analog data signal on said recording medium; and discriminator means operatively associated with said recording medium for identifying whether said recording medium is said first or said second type, whereby if said recording medium is said first type, one of the group consisting of said digital data signal, said first analog data signal and said second analog data signal is recorded thereon, and if said recording medium is said second type, one of the group consisting of said first analog data signal and said second analog data signal is recorded thereon.

2. A data signal recording method for selectively recording digital and/or analog data signals on a first or second type of recording medium, said method comprising the steps of:

receiving a digital signal and producing said digital data signal;

decoding said digital data signal to produce a first analog data signal;

receiving an analog signal and producing an analog output signal;

performing a preselected process on said analog output signal to form a second analog data signal; and identifying whether said recording medium is said first or said second type;

whereby if said recording medium is said first type, one of the group consisting of said digital data signal, said first analog data signal and said second analog data signal is recorded thereon, and if said recording medium is said second type, one of the group consisting of said first analog data signal and said second analog data signal is recorded thereon.

3. A system, as claimed in claim 1, wherein said first type of recording medium is a high-performance recording medium and said second type of recording medium is a standard-performance recording medium.

4. A method, as claimed in claim 2, wherein said first type of medium is a high-performance medium and said second type of medium is a standard-performance recording medium.

5. A system, as claimed in claim 3, wherein when said digital data signal or said analog data signal is recorded on said high-performance recording medium:

in said digital recording means, a first recording specification for performing signal processing is selected in which said digital data signal is recorded as a bit stream;

in said analog recording means, a second recording specification for performing signal processing is selected in which said first or said second analog data signal is recorded over a broader-than-standard frequency bandwidth;

in said analog recording means, a third recording specification for performing signal processing is selected in which said first or said second analog data signal is recorded over a standard frequency bandwidth; and when said first or said second analog data signal is recorded on said standard-performance recording medium, said third recording specification is selected in said analog recording means.

6. A method, as claimed in claim 4, wherein for recording said digital data signal on said high-performance medium, a first recording specification is selected in which said digital data is recorded as a bit stream.

7. A method, as claimed in claim 4, wherein for recording said first or said second analog data signal on said high-performance medium, a second recording specification is selected in which a broader-than-standard frequency recording bandwidth is used.

8. A method, as claimed in claim 4, wherein for recording said first or second analog data signal on said high-performance medium, a third recording specification is selected in which a standard frequency recording bandwidth is used.

9. A method, as claimed in claim 4, wherein for recording said first or said second analog data signal on a standard-performance recording medium, a third recording specification is selected in which a standard frequency recording bandwidth is used.

10. A data signal recording and/or playback system for selectively recording and/or playing back digital and/or analog data signals on/from a recording medium, said recording medium capable of having at least one or a combination of digital and analog data signals comprising:

first receiving means for receiving a digital signal and producing said digital data signal;

a digital signal processor responsive to said digital data signal for performing a preselected process thereon and recording the resulting signal on said recording medium, said digital signal processor being capable of detecting when said digital data signal is recorded on said recording medium and playing back such signal;

decoder means for decoding said digital data signal from said first receiver, from an external source, or from said digital signal processor and producing a first analog data signal;

second receiving means for receiving an analog signal and producing an analog output signal;

an analog signal processor for performing a preselected process on said analog signal from said second receiving means, on an analog signal from said external source or on said first analog data signal to form a second analog data signal and recording said second analog data signal on said recording medium, said analog signal processor being capable of detecting when an analog data signal is recorded on said recording medium and playing back the recorded analog data signal; and an output terminal for outputting at least said analog data signal supplied from said second receiving means, from said external source, or from said analog signal processor;

whereby during recording or recording/playback standby operation, when said digital data signal is selected for output, said first analog signal is output from said decoder means;

when an analog data signal is selected for output, an analog data signal from said second receiving means or from said external source is output;

during playback, when it is detected that a digital data signal is recorded on said recording medium, the reproduced digital data signal is decoded in said decoder and output as an analog data signal; and when it is detected that an analog data signal is recorded on said recording medium, the reproduced analog signal is output.

* * * * *